| (12) United States Patent<br>Sundaram | (10) Patent No.: US 10,116,513 B1<br>(45) Date of Patent: Oct. 30, 2018 |
|---|---|

(54) SYSTEMS AND METHODS FOR MANAGING SMART BUILDING SYSTEMS

(71) Applicant: Symantec Corporation, Mountain View, CA (US)

(72) Inventor: Ramakrishnan Meenakshi Sundaram, Tamil Nadu (IN)

(73) Assignee: Symantec Corporation, Mountain View, CA (US)

( * ) Notice: Subject to any disclaimer, the term of this patent is extended or adjusted under 35 U.S.C. 154(b) by 332 days.

(21) Appl. No.: 15/041,002

(22) Filed: Feb. 10, 2016

(51) Int. Cl.
| G06F 15/173 | (2006.01) |
| H04L 12/24 | (2006.01) |
| H04L 29/08 | (2006.01) |
| H04L 12/28 | (2006.01) |
| G06F 17/30 | (2006.01) |

(52) U.S. Cl.
CPC ........ *H04L 41/12* (2013.01); *G06F 17/30424* (2013.01); *H04L 12/2816* (2013.01); *H04L 67/18* (2013.01)

(58) Field of Classification Search
CPC ..... H04L 41/12; H04L 12/2816; H04L 67/18; G06F 17/30424
See application file for complete search history.

(56) References Cited

U.S. PATENT DOCUMENTS

| 8,620,841 | B1 * | 12/2013 | Filson ................. H04L 12/1895<br>706/12 |
| 8,925,037 | B2 | 12/2014 | Marino et al. |
| 9,154,466 | B2 | 10/2015 | Sobel et al. |
| 9,202,173 | B1 | 12/2015 | Dotan et al. |
| 9,218,468 | B1 | 12/2015 | Rappaport |
| 9,282,435 | B2 | 3/2016 | Ward et al. |

(Continued)

FOREIGN PATENT DOCUMENTS

| EP | 1 703 431 A2 | 9/2006 |
| EP | 3166086 A1 | 5/2017 |

(Continued)

OTHER PUBLICATIONS

Fake GPS Location app, https://play.google.com/store/apps/details?id=com.lexa.fakegps&hl=en, as accessed Feb. 23, 2017, Lexa Tools.

(Continued)

*Primary Examiner* — Padma Mundur
(74) *Attorney, Agent, or Firm* — FisherBroyles, LLP

(57) ABSTRACT

A computer-implemented method for managing smart building systems may include (1) detecting a set of smart devices comprising first and second smart devices in a smart building network, (2) maintaining a smart device management repository by, for each smart device, maintaining information indicating capabilities of the smart device and tracking a location of the smart device, (3) detecting a change in a state of the first smart device, (4) using the smart device management repository to evaluate a proximity of the first smart device to the second smart device and determine that a capability of the second smart device is correlated with the change in state of the first smart device, and (5) triggering a management action in the smart building network based on both the proximity of and the correlation between the first and second smart devices. Various other methods, systems, and computer-readable media are also disclosed.

18 Claims, 7 Drawing Sheets

(56) References Cited

U.S. PATENT DOCUMENTS

| | | | |
|---|---|---|---|
| 9,396,599 B1* | 7/2016 | Malhotra | G07C 9/00174 |
| 9,661,483 B2 | 5/2017 | Bastianelli | |
| 9,697,660 B1 | 7/2017 | Sokolov et al. | |
| 9,817,958 B1 | 11/2017 | McCorkendale | |
| 2002/0059532 A1 | 5/2002 | Ata et al. | |
| 2004/0153671 A1 | 8/2004 | Schuyler et al. | |
| 2005/0097320 A1 | 5/2005 | Golan et al. | |
| 2006/0031682 A1 | 2/2006 | Sakai et al. | |
| 2006/0082439 A1 | 4/2006 | Bazakos et al. | |
| 2006/0164282 A1 | 7/2006 | Duff et al. | |
| 2010/0299002 A1 | 11/2010 | Abdallah et al. | |
| 2010/0302143 A1 | 12/2010 | Spivack | |
| 2010/0325712 A1 | 12/2010 | Kakuta et al. | |
| 2011/0219423 A1 | 9/2011 | Aad et al. | |
| 2011/0252131 A1 | 10/2011 | Karaoguz | |
| 2011/0321143 A1 | 12/2011 | Angaluri et al. | |
| 2012/0011559 A1 | 1/2012 | Miettinen et al. | |
| 2012/0079576 A1 | 3/2012 | Han et al. | |
| 2012/0190386 A1 | 7/2012 | Anderson | |
| 2012/0246739 A1 | 9/2012 | Mebed | |
| 2012/0331527 A1 | 12/2012 | Walters et al. | |
| 2013/0151617 A1 | 6/2013 | Davis | |
| 2013/0159876 A1 | 6/2013 | Narasimhan et al. | |
| 2013/0197998 A1 | 8/2013 | Buhrmann et al. | |
| 2013/0275498 A1 | 10/2013 | Cheng et al. | |
| 2013/0290201 A1 | 10/2013 | Rodriguez Carrillo | |
| 2013/0318580 A1 | 11/2013 | Gudlavenkatasiva et al. | |
| 2015/0288687 A1 | 10/2015 | Heshmati et al. | |
| 2016/0082926 A1 | 3/2016 | Mouser et al. | |
| 2016/0140257 A1 | 5/2016 | Vega | |
| 2016/0165651 A1 | 6/2016 | Pathuri et al. | |

FOREIGN PATENT DOCUMENTS

| | | |
|---|---|---|
| JP | 2007293062 A | 11/2007 |
| JP | 2009140051 A | 6/2009 |
| JP | 2010128778 A | 5/2010 |
| WO | WO 2012/162009 A1 | 11/2012 |

OTHER PUBLICATIONS

How SUPL Reveals My Identity and Location to Google When I Use GPS, http://mobilesociety.typepad.com/mobile_life/2014/08/supl-reveals-my-identity-and-location-to-google.html, published Aug. 31, 2014, Mobilesociety.
Assisted GPS, https://en.wikipedia.org/wiki/Assisted_GPS, as accessed Feb. 24, 2017, Wikipedia.
Lei Gu, et al; Systems and Methods for Enforcing Access-Control Policies; U.S. Appl. No. 15/194,403, filed Jun. 27, 2016.
HomeNews—WiFi can be used to count people with or without electronic gadgets; https://www.rt.com/news/266188-wifi-signal-human-density/; as accessed on Jun. 21, 2016; Jun. 10, 2015.
Ali et al.; Keystroke Recognition Using WiFi Signals; https://www.sigmobile.org/mobicom/2015/papers/p90-aliA.pdf; Sep. 7, 2015.
iRobot's Roomba 980 Maps Your Home Via Camera and Takes Smartphone Commands; http://blogs.wsj.com/personal-technology/2015/09/16/irobots-roomba-980-maps-your-home-via-camera-and-takes-smartphone-commands/; as accessed on Jun. 21, 2016; Sep. 16, 2015.
Microsoft Hololens; https://www.microsoft.com/microsoft-hololens/en-us; as accessed on Jun. 21, 2016.
Bruce McCorkendale, et al; Systems and Methods for Constructing a Volumetric Model of a Space from a Constellation of Sensing Devices; U.S. Appl. No. 14/833,655, filed Aug. 24, 2015.
Daniel Marino, et al; Systems and Methods for Enforcing Data-Loss-Prevention Policies Using Mobile Sensors; U.S. Appl. No. 13/733,131, filed Jan. 2, 2013.
Devicelock; Preventing Devastating Data Leaks by Securing the Endpoints of Your Network; http://www.devicelock.com/products/, as accessed on Sep. 10, 2012.

Konstantinos Kotis et al.; An ontology for the automated deployment of applications in heterogeneous IoT environments; http://www.semantic-web-journal.net/sites/default/files/swj247_0.pdf, as accessed Jun. 25, 2015; Semantic Web Journal; Feb. 13, 2012.
OMA Device Management; http://openmobilealliance.org/about-oma/work-program/device-management/, as accessed Jun. 25, 2015; Jan. 15, 2013.
Open Mobile Alliance (OMA); http://openmobilealliance.org/, as accessed Jun. 25, 2015; Aug. 2, 2002.
openHAB; http://www.openhab.org/, as accessed Jun. 25, 2015; Jul. 11, 2011.
Daniel Siewiorek; SenSay: A Context-Aware Mobile Phone; Human Computer Interaction and Institute for Complex Engineered Systems; As accessed on Sep. 10, 2012.
Megan Treacy; 10 environmental sensors that go along with you; http://www.treehugger.com/clean-technology/environmental-sensors.html, as accessed Jun. 25, 2015; Mar. 5, 2013.
Zenprise; Mobile DLP (Data Leakage Prevention); http://www.zenprise.com/solutions/mobile-data-leakage-prevention/, as accessed on Sep. 10, 2012.
Alastair R. Beresford et al., MockDroid: trading privacy application functionality on smartphones; Proceedings of the 12th Workshop on Mobile Computing Systems and Applications, HotMobile '11, Phoenix, Arizona, Mar. 1-3, 2011.
Jason Franklin et al.; Passive Data Link Layer 802.11 Wireless Device Driver Fingerprinting; Proceedings of USENIX Security '06, Jul. 31-Aug. 4, 2006, Vancouver, BC, Canada.
School of Privacy, Guide on How to be Safe, Secure and Protect Your Online Anonymity; Fake GPS Location—Android; http://school-of-privacy.com/post/70381068300/fake-gps-location-andoid; Dec. 18, 2013.
SensorSimulator; https://code.google.com/p/openintents/wiki/SensorSimulator; Jan. 12, 2013.
William E. Sobel, et al.; Systems and Methods for Introducing Variation in Sub-System Output Signals to Prevent Device Fingerprinting; U.S. Appl. No. 14/139,824, filed Dec. 23, 2013.
C. Rigney et al; Remote Authentication Dial in User Service (RADIUS); https://tools.ietf.org/html/rfc2865, as accessed Nov. 6, 2015; Request for Comments: 2865; Jun. 2000.
C. Neuman et al; The Kerberos Network Authentication Service (V5); https://tools.ietf.org/html/rfc4120, as accessed Nov. 6, 2015; Request for Comments: 4120; Jul. 2005.
Kerberos: The Network Authentication Protocol; http://web.mit.edu/kerberos/, as accessed Nov. 6, 2016; Jan. 28, 1999.
Microsoft Negotiate; https://msdn.microsoft.com/en-us/library/windows/desktop/aa378748(v=vs.85).aspx. as accessed Nov. 6, 2015; Nov. 13, 2011.
Microsoft NTLM; https://msdn.microsoft.com/en-us/library/windows/desktop/aa378749(v=vs.85).aspx, as accessed Nov. 6, 2015; Nov. 12, 2011.
Prasad Bokare, et al; Systems and Methods for Facilitating Single Sign-On for Multiple Devices; U.S. Appl. No. 15/041,040, filed Feb. 11, 2016.
Symantec Identity Access Manager; https://www.symantec.com/identity-access-manager/, as accessed Nov. 6, 2015; Symantec Corporation; Nov. 7, 2014.
Symantec Validation and ID Protection Service; http://www.symantec.com/vip-authentication-service/, as accessed Nov. 6, 2015; Symantec Corporation; Feb. 10, 2014.
ZigBee Alliance, http://www.zigbee.org/, as accessed Dec. 14, 2015, (Nov. 14, 2001).
Z-Wave, http://www.z-wave.com/, as accessed Dec. 14, 2015, (Dec. 23, 2002).
OMA Device Management Working Group, http://openmobilealliance.org/about-oma/work-program/device-management/, as accessed Dec. 14, 2015, (Jan. 15, 2013).
Lei Gu, et al; Systems and Methods for Enforcing Access-Control Policies in an Arbitrary Physical Space; U.S. Appl. No. 15/195,677, filed Jun. 28, 2016.
Bruce McCorkendale; Systems and Methods for Authenticating Users; U.S. Appl. No. 14/834,949, filed Aug. 25, 2015.
Home—Good Security Questions; http://goodsecurityquestions.com/, as accessed Jun. 25, 2015, (Dec. 27, 2007).

(56) References Cited

OTHER PUBLICATIONS

Kevin Jiang, et al; Systems and Methods for Using Vehicles as Information Sources for Knowledge-Based Authentication; U.S. Appl. No. 14/979,620, filed Dec. 28, 2015.
Snapshot; https://www.progressive.com/auto/snapshot/, as accessed Nov. 18, 2015; Progressive Casualty Insurance Company; on or before Nov. 18, 2015.
FasTrak; https://www.bayareafastrak.org/en/howitworks/gettingstarted.shtml, as accessed Nov. 18, 2015; on or before Nov. 18, 2015.
Ilya Sokolov, et al; Systems and Methods for Verifying User Attributes; U.S. Appl. No. 14/985,675, filed Dec. 31, 2015.
E-ZPass, https://www.e-zpassny.com/en/home/index.shtml, as accessed Nov. 18, 2015, (on or before Nov. 18, 2015).
Fastpass, https://disneyland.disney.go.com/guest-services/fastpass/, as accessed Nov. 18, 2015, Disney, (On or before Nov. 18, 2015).
Toll Payment Options at the Golden Gate Bridge, http://www.goldengate.org/tolls/tollpaymentoptions.php, as accessed Nov. 18, 2015, (On or before Nov. 18, 2015).
OnStar, https://www.onstar.com/us/en/home.html, as accessed Nov. 18, 2015, (On or before Nov. 18, 2015).
BMW Assist, http://www.bmwusa.com/Standard/Content/Explore/BMWValue/BMWAssist/defaulta spx, as accessed Nov. 18, 2015, (On or before Nov. 18, 2015).
Department of Motor Vehicles, https://www.dmv.ca.gov/portal/dmv, as accessed Nov. 18, 2015, (On or before Nov. 18, 2015).
Ilya Sokolov, et al; Systems and Methods for Evaluating Identity Intensity; U.S. Appl. No. 15/057,618, filed Mar. 1, 2016.
Evgenios Kornaropoulos, et al; Systems and Methods for Securely Detecting Data Similarities; U.S. Appl. No. 14/871,868, filed Sep. 30, 2015.
Symantec VIP Intelligent Authentication, http://www.symantec.com/content/en/us/enterprise/fact_sheets/b-vip_intelligent_authentication_DS_21213685.en-us.pdf, as accessed Jan. 13, 2016, Data Sheet: Authentication, Symantec Corporation, (Oct. 2011).
Ilya Sokolov et al; Systems and Methods for Certifying Geolocation Coordinates of Computing Devices; U.S. Appl. No. 15/466,156, filed Mar. 22, 2017.
Ilya Sokolov et al.; Systems and Methods for Securely Sharing Cloud-Service Credentials Within a Network of Computing Devices; U.S. Appl. No. 15/276,105, filed Sep. 26, 2016.
Amazon Echo, Nov. 6, 2014: https://en.wikipedia.org/wiki/Amazon_Echo.
Google Home, announced May 18, 2016: https://en.wikipedia.org/wiki/Google_Home.
Secret sharing, as accessed on Sep. 13, 2016: https://en.wikipedia.org/wiki/Secret_sharing.
Norton Identity Safe, announced Aug. 28, 2007: https://identitysafe.norton.com/.

* cited by examiner

SYSTEMS AND METHODS FOR MANAGING SMART BUILDING SYSTEMS

BACKGROUND

Smart buildings and smart appliances are increasingly used to facilitate automation of domestic activities. Traditionally, smart building management systems allow users to gain insights into smart appliances and devices and to control these devices through software applications. Users may be able to make decisions on how to control smart devices based on the detailed information provided by smart building management systems. For example, users may remotely enable a security system to monitor a smart home and then receive security updates through a smart home management system interface.

However, with an increasing number of smart devices within a smart building system, the amount of information and options available to users may also greatly increase. The increase in information may eventually overwhelm users and cause difficulties in making the best decision when managing a smart building system. For example, in a security breach, users may be presented with information and options unrelated to security, such as the temperature in the smart building, that should not affect decisions regarding how to respond to the breach. In some cases, pertinent information may be missed due to the inability to parse a large amount of information from a holistic view. In other cases, the information overload may result in users micromanaging their smart buildings rather than benefiting from the advantages of smart devices. Accordingly, the instant disclosure identifies and addresses a need for additional and improved systems and methods for managing smart building systems.

SUMMARY

As will be described in greater detail below, the instant disclosure generally relates to systems and methods for managing multiple smart devices within a smart building network. For example, the disclosed systems may detect changes in smart devices and, using contextual information, correlate the changes with other smart devices in the smart building network. Furthermore, by modifying smart recipes based on the correlation of smart devices, these systems may provide better responses to a change detected in a smart building.

In one example, a computer-implemented method for managing smart building systems may include (1) detecting a set of smart devices in a smart building network, the set of smart devices including first and second smart devices, (2) maintaining a smart device management repository by, for each smart device in the set of smart devices, maintaining information indicating one or more capabilities of the smart device and tracking a location of the smart device, (3) detecting a change in a state of the first smart device, (4) in response to detecting the change in state of the first smart device, using the smart device management repository to evaluate a proximity of the first smart device to the second smart device and determine that a capability of the second smart device is correlated with the change in state of the first smart device, and (5) triggering a management action in the smart building network based on both the proximity of the first smart device to the second smart device and the correlation between the first and second smart devices.

In one embodiment, maintaining the information indicating one or more capabilities of the smart device may include detecting identifying information about the smart device. Additionally or alternatively, maintaining the information may include adding the identifying information to the smart device management repository. Furthermore, maintaining the information may include querying a database of smart device capabilities based on the identifying information. In additional embodiments, maintaining the information may include detecting the capabilities of the smart device.

In some examples, the location of the smart device may include a type of room in which the smart device is located. Additionally or alternatively, the location of the smart device may include an orientation of the room within a smart building.

In some embodiments, the change in state of the first smart device may include a change in state of a sensor associated with the first smart device. In further embodiments, the change in state of the first smart device may include a change in state of a component of the first smart device.

In one example, the proximity of the first smart device to the second smart device may include a physical proximity indicative of a difference in location between the first and second smart devices. Additionally or alternatively, the proximity may include a temporal proximity indicative of a difference in timing of the change in state of the first smart device with a change in a state of the second smart device.

In one embodiment, determining that a capability of the second smart device is correlated with the change in state of the first smart device may include detecting contextual information about scheduled events in the smart building network. Additionally, determining that the capability of the second smart device is correlated with the change in state of the first smart device may include correlating the second smart device with the first smart device based on the contextual information and the proximity of the first smart device to the second smart device.

In some examples, the management action in the smart building network may include retrieving at least one smart recipe from a smart recipe database, modifying the smart recipe based on the correlation between the first and second smart devices, and/or presenting the modified smart recipe to a user of the smart building network. These examples may further include receiving a smart recipe selection from the user of the smart building network and executing at least one action in the smart building network based on the smart recipe selection. Additionally or alternatively, in other examples, the management action in the smart building network may include changing a state of the second smart device.

In one embodiment, a system for implementing the above-described method may include (1) a device module, stored in memory, that detects a set of smart devices in a smart building network, the set of smart devices including first and second smart devices, (2) a maintenance module, stored in memory, that maintains a smart device management repository by, for each smart device in the set of smart devices, maintaining information indicating one or more capabilities of the smart device and tracking a location of the smart device, (3) a detection module, stored in memory, that detects a change in a state of the first smart device, (4) a correlation module, stored in memory, that, in response to detecting the change in state of the first smart device, uses the smart device management repository to evaluate a proximity of the first smart device to the second smart device and determine that a capability of the second smart device is correlated with the change in state of the first smart device, and (5) a response module, stored in memory, that triggers a management action in the smart building network based on both the proximity of the first smart device to the second smart device and the correlation between the first and second smart devices. In addition, the system may include at least one processor that executes the device module, the maintenance module, the detection module, the correlation module, and the response module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect a set of smart devices in a smart building network, the set of smart devices including first and second smart devices, (2) maintain a smart device management repository by, for each smart device in the set of smart devices, maintaining information indicating one or more capabilities of the smart device and tracking a location of the smart device, (3) detect a change in a state of the first smart device, (4) in response to detecting the change in state of the first smart device, use the smart device management repository to evaluate a proximity of the first smart device to the second smart device and determine that a capability of the second smart device is correlated with the change in state of the first smart device, and (5) trigger a management action in the smart building network based on both the proximity of the first smart device to the second smart device and the correlation between the first and second smart devices.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
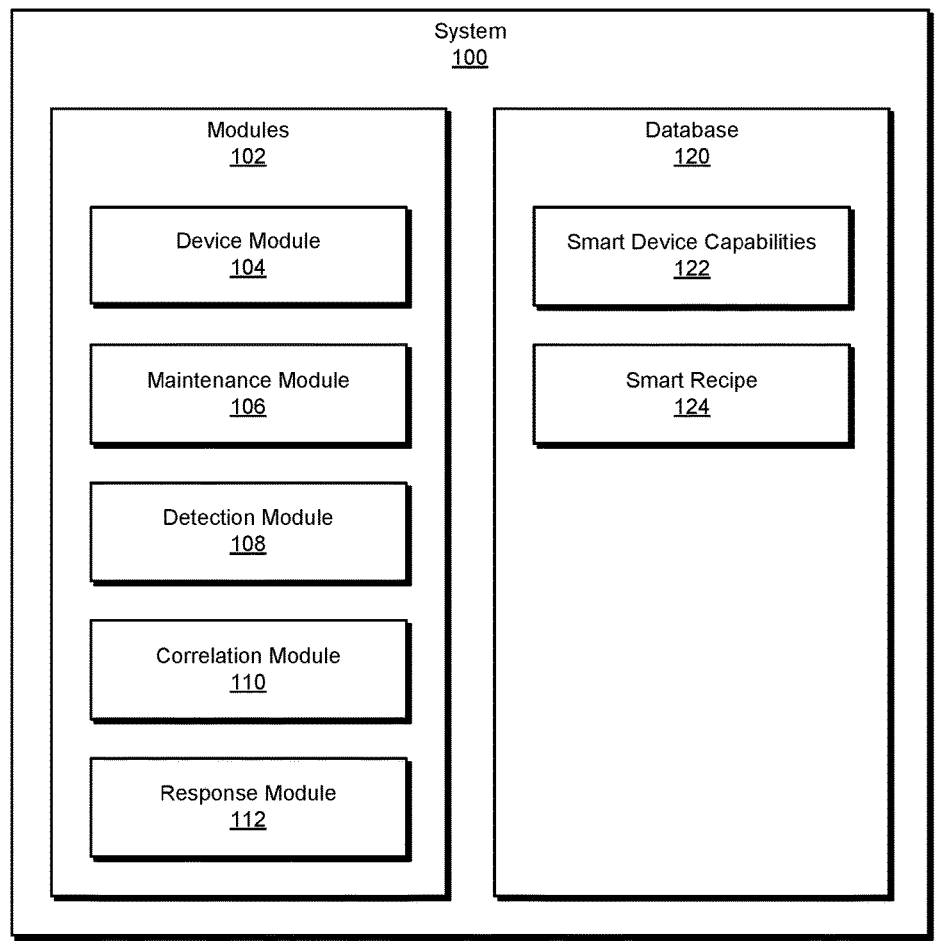
FIG. 1 is a block diagram of an exemplary system for managing smart building systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for managing smart building systems. As will be explained in greater detail below, by detecting state changes in smart devices and gathering additional contextual information about a smart building, the systems and methods disclosed herein may create responses tailored to groups of related smart devices. For example, by maintaining a smart device management repository modeled on the relation of smart devices within the smart building, the disclosed systems and methods may correlate smart devices based on location and capabilities for a holistic understanding of state changes. The disclosed systems and methods may then use the additional contextual information to create, update, or implement smart recipes that manage the smart devices efficiently.

Figure 2:
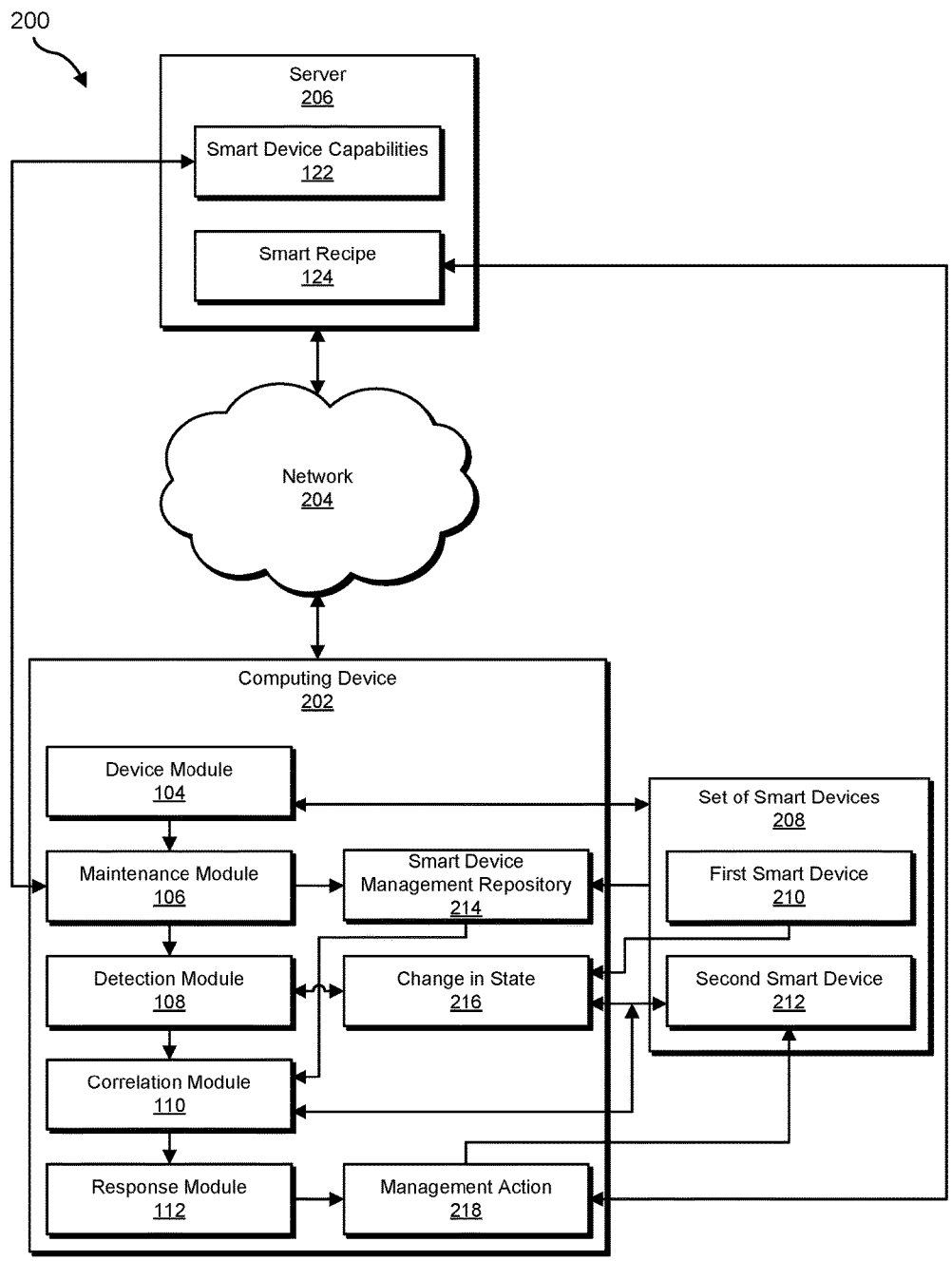
FIG. 2 is a block diagram of an additional exemplary system for managing smart building systems.

The following will provide, with reference to FIGS. 1 and 2, detailed descriptions of exemplary systems for managing smart building systems. Detailed descriptions of corresponding computer-implemented methods will also be provided in connection with FIG. 3. In addition, detailed descriptions of an exemplary correlation between two exemplary smart devices using exemplary contextual information will be provided in connection with FIG. 4. Furthermore, detailed descriptions of an exemplary modification of two exemplary smart recipes sent to a user will be provided in connection with FIG. 5. Finally, an exemplary computing system and network architecture capable of implementing one or more of the embodiments described herein will be provided in connection with FIGS. 6 and 7, respectively.

FIG. 1 is a block diagram of exemplary system 100 for managing smart building systems. The term "smart building," as used herein, generally refers to a building containing a multitude of smart devices used to control and automate various domestic activities for the building. Examples of smart buildings may include commercial and industrial buildings as well as residential buildings, such as smart homes, installed with smart devices. The term "smart device," as used herein, generally refers to a computing device or sensor capable of performing specific actions autonomously or with user input and/or connecting to other smart devices. Examples of smart devices may include, without limitation, smart appliances, smart sensors, smartphones, tablets, wearable devices, security systems, lighting systems, HVAC (heating, ventilation, and air conditioning) systems, IoT (Internet of Things) devices, or any other device that may be networked.

As illustrated in FIG. 1, exemplary system 100 may include one or more modules 102 for performing one or more tasks. For example, and as will be explained in greater detail below, exemplary system 100 may include a device module 104 that may detect a set of smart devices in a smart building network, the set of smart devices including first and second smart devices. Exemplary system 100 may additionally include a maintenance module 106 that may maintain a smart device management repository by, for each smart device in the set of smart devices, maintaining information indicating one or more capabilities of the smart device and tracking a location of the smart device. The term "smart device management repository," as used herein, generally refers to a repository used to model the location and state of smart devices within a smart building network, such as a digital three-dimensional representation of the smart building.

Exemplary system 100 may also include a detection module 108 that may detect a change in a state of the first smart device. Furthermore, exemplary system 100 may include a correlation module 110 that, in response to detecting the change in state of the first smart device, may use the smart device management repository to evaluate a proximity of the first smart device to the second smart device and determine that a capability of the second smart device is correlated with the change in state of the first smart device. Finally, exemplary system 100 may include a response module 112 that may trigger a management action in the smart building network based on both the proximity of the first smart device to the second smart device and the correlation between the first and second smart devices. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, server 206, first smart device 210, and/or second smart device 212), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store smart device capabilities 122, which may include information about smart devices in the network, and/or a smart recipe 124, which may be used to manage smart devices. Additionally or alternatively, database 120 may be configured to store the smart device management repository, such as smart device management repository 214 in FIG. 2, which may maintain a model of the smart devices in the network.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120. Similarly, both server 206 and computing device 202 may be merged into a single machine or computing system.

In one embodiment, one or more of modules 102 from FIG. 1 may, when executed by at least one processor of computing device 202 and/or server 206, enable computing device 202 and/or server 206 to control smart devices within a smart building system. For example, and as will be described in greater detail below, device module 104 may detect a set of smart devices 208, including a first smart device 210 and a second smart device 212, in a smart building network. Maintenance module 106 may maintain a smart device management repository 214 by, for each smart device in set of smart devices 208, maintaining information indicating one or more capabilities of the smart device and tracking a location of the smart device. Detection module 108 may then detect a change in a state 216 of first smart device 210. Furthermore, correlation module 110 may use smart device management repository 214 to evaluate a proximity of first smart device 210 to second smart device 212 and determine that a capability of second smart device 212 is correlated with change in state 216 of first smart device 210. Finally, response module 112 may trigger a management action 218 based on both the proximity of first smart device 210 to second smart device 212 and the correlation between first smart device 210 and second smart device 212.

In the example of FIG. 2, and as will be explained in greater detail below, computing device 202 may first detect first smart device 210 and second smart device 212 within set of smart devices 208. Computing device 202 may obtain smart device capabilities 122 from server 206, via network 204, and use smart device management repository 214 to model the capabilities and locations of first smart device 210 and second smart device 212. Computing device 202 may then detect change in state 216 while monitoring first smart device 210. Next, computing device 202 may correlate change in state 216 with second smart device 212 using the model of smart device management repository 214. Finally, computing device 202 may execute management action 218 based on smart recipe 124, obtained from server 206 via network 204, to control second smart device 212. As used herein, the term "smart recipe" generally refers to a set of commands created from detecting the state of a set of smart devices and used to manage the set of smart devices.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of storing and/or managing smart device and smart recipe information. Examples of server 206 include, without limitation, application servers and database servers configured to provide various database services and/or run certain software applications.

Figure 7:
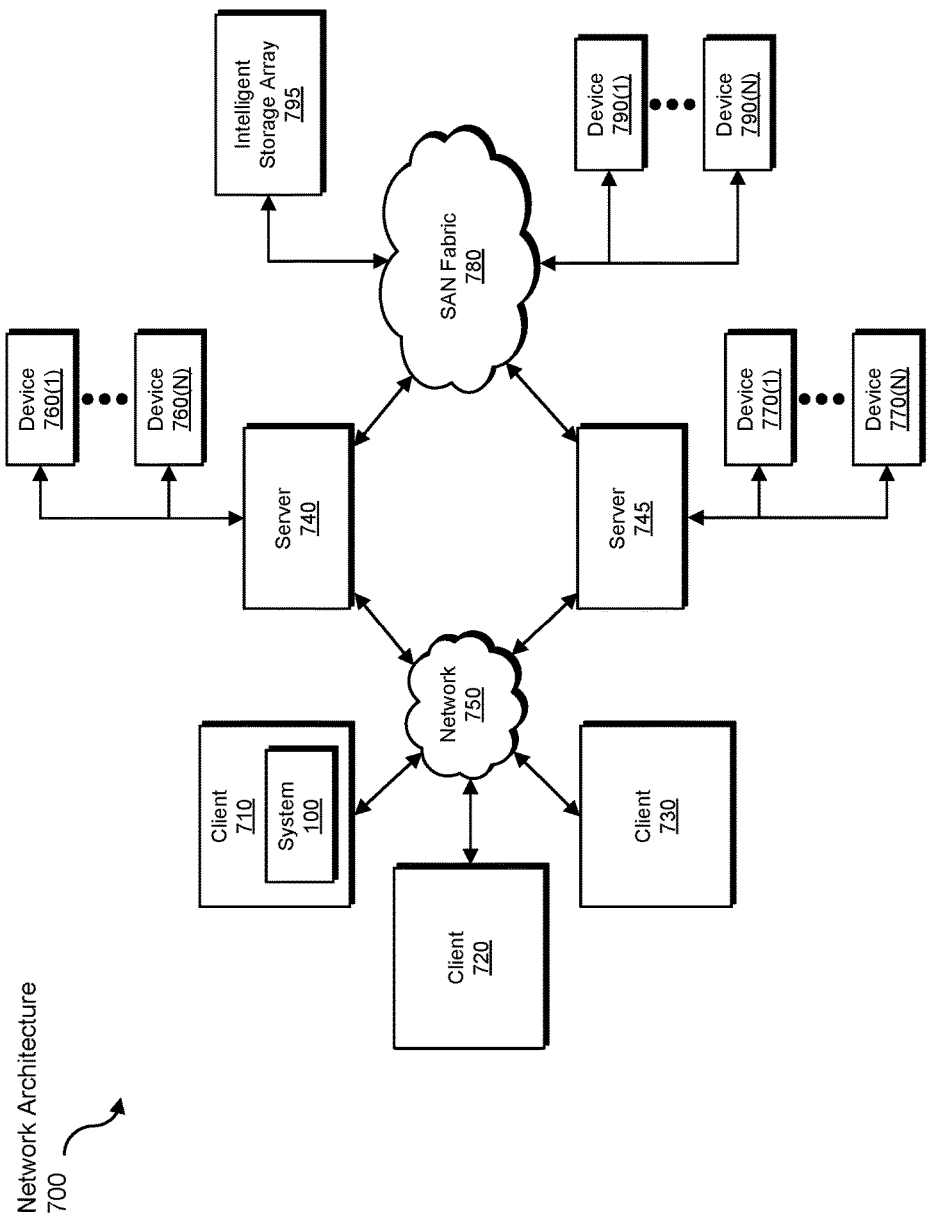
FIG. 7 is a block diagram of an exemplary computing network capable of implementing one or more of the embodiments described and/or illustrated herein.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM)

network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
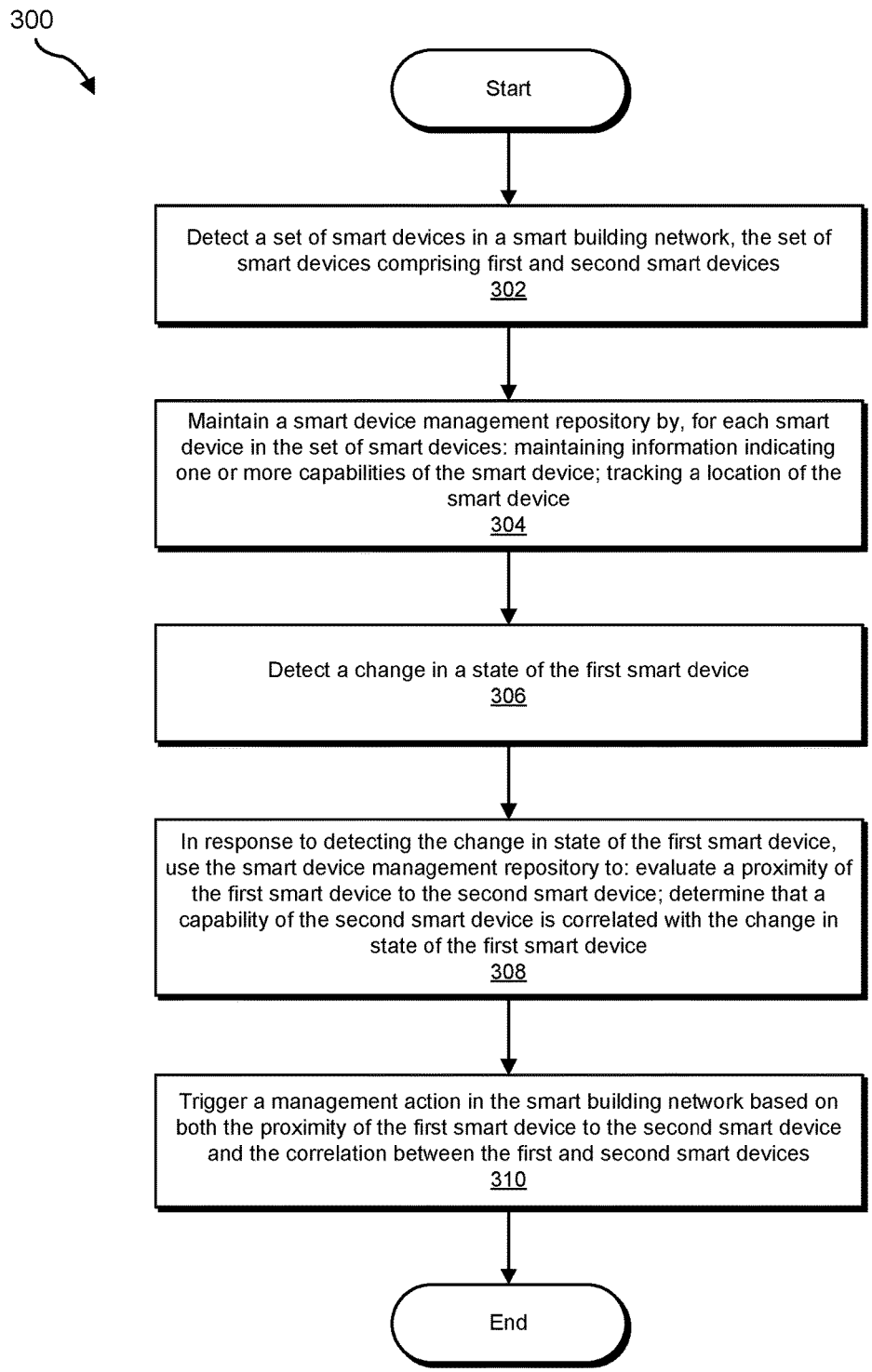
FIG. 3 is a flow diagram of an exemplary method for managing smart building systems.

FIG. 3 is a flow diagram of an exemplary computer-implemented method 300 for managing smart building systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may detect a set of smart devices in a smart building network, the set of smart devices including first and second smart devices. For example, device module 104 may, as part of computing device 202 in FIG. 2, detect set of smart devices 208 in a smart building network, set of smart devices 208 including first smart device 210 and second smart device 212.

Device module 104 may detect set of smart devices 208 in a variety of ways. In one embodiment, device module 104 may periodically scan for changes in the smart building network and identify new smart devices added to the network. Device module 104 may also scan for smart devices connected to the network during an initial set up to detect set of smart devices 208. Additionally or alternatively, device module 104 may receive a notification when a new smart device, such as first smart device 210 or second smart device 212, is added to the smart building network. Device module 104 may also detect set of smart devices 208 in response to any other suitable types of triggers.

Returning to FIG. 3, at step 304, one or more of the systems described herein may maintain a smart device management repository by, for each smart device in the set of smart devices, maintaining information indicating one or more capabilities of the smart device and tracking a location of the smart device. For example, maintenance module 106 may, as part of computing device 202 in FIG. 2, maintain smart device management repository 214 by, for first smart device 210 and second smart device 212, maintaining information indicating one or more capabilities of the smart devices and tracking locations of the smart devices.

Maintenance module 106 may maintain smart device management repository 214 in a variety of ways. In some examples, maintenance module 106 may maintain the information indicating one or more capabilities of a smart device, such as first smart device 210 and second smart device 212, by first detecting identifying information about the smart device. In these examples, the identifying information may include a name of the smart device, a model of the smart device, a network identifier of the smart device, or other information that distinguishes the smart device from other devices. Maintenance module 106 may then add the identifying information to smart device management repository 214. Furthermore, maintenance module 106 may query a database of smart device capabilities, such as smart device capabilities 122 on server 206, based on the identifying information. Alternatively, maintenance module 106 may directly detect the capabilities of smart devices, such as by receiving information about the capabilities from first smart device 210 and second smart device 212.

In some embodiments, the locations of first smart device 210 and/or second smart device 212 may include a type of room in which the smart devices are located. For example, first smart device 210 may be located in a garage and second smart device 212 may be located in a lobby of the smart building. Additionally or alternatively, the locations may include an orientation of the room within the smart building. In the above example, the garage and lobby may be adjacent to each other, and thus, first smart device 210 may be adjacent to second smart device 212. The orientation may also indicate a direction the rooms face or the locations of the rooms within the smart building. Furthermore, the locations may include physical coordinates or other data to orient the smart devices within the smart building.

In the above examples, smart device management repository 214 may include a repository of smart devices and their capabilities. Additionally, smart device management repository 214 may include contextual information and a repository of events and/or changes in state of the smart devices. Maintenance module 106 may use the additional contextual and event information to augment the basic smart device repository by adding multiple layers of information. Smart device management repository 214 may also include a smart recipe manager that uses the information in the repository to manage various smart recipes.

Returning to FIG. 3, at step 306, one or more of the systems described herein may detect a change in a state of the first smart device. For example, detection module 108 may, as part of computing device 202 in FIG. 2, detect change in state 216 of first smart device 210.

Detection module 108 may detect change in state 216 in a variety of ways. First smart device 210 may include multiple physical components and sensors with different functions, and change in state 216 may include changes in one or more components. In one embodiment, change in state 216 may include a change in state of a sensor associated with first smart device 210. For example, detection module 108 may detect a change in temperature sensed by smart device 210. In this embodiment, first smart device 210 may be a smart sensor or have a sensor component. In another embodiment, change in state 216 may include a change in state of a component of first smart device 210. In this embodiment, change in state 216 may be caused by a user of the smart building or by another smart device. For example, first smart device 210 may be part of the lighting system in the smart building, and the user may turn off a light, triggering change in state 216. In another example, first smart device 210 may track the location of a smartphone and may then activate due to a change in position of the smartphone. Detection module 108 may subsequently detect the activation as change in state 216.

Returning to FIG. 3, at step 308, one or more of the systems described herein may, in response to detecting the change in state of the first smart device, use the smart device management repository to evaluate a proximity of the first smart device to the second smart device and determine that a capability of the second smart device is correlated with the change in state of the first smart device. For example, correlation module 110 may, as part of computing device 202 in FIG. 2, use smart device management repository 214 to evaluate a proximity of first smart device 210 to second smart device 212 and determine that a capability of second smart device 212 is correlated with change in state 216 of first smart device 210.

Correlation module 110 may evaluate the proximity of first smart device 210 to second smart device 212 in a variety of ways. In some examples, the proximity of first smart device 210 to second smart device 212 may include a physical proximity indicative of a difference in location between first smart device 210 and second smart device 212.

Additionally or alternatively, the proximity may include a temporal proximity indicative of a difference in timing of change in state 216 of first smart device 210 with a change in a state of second smart device 212.

Furthermore, correlation module 110 may determine that the capability of second smart device 212 is correlated with change in state 216 in a variety of ways. In some embodiments, correlation module 110 may detect contextual information about scheduled events in the smart building network. As used herein, the term "scheduled event" generally refers to a scheduled activity in a smart building and/or a scheduled change to a smart device that may affect the state of one or more smart devices in the smart building.

Correlation module 110 may then correlate second smart device 212 with first smart device 210 based on the contextual information and the proximity of first smart device 210 to second smart device 212. The contextual information may alternatively include weather, a time of day, a mood of a user of the smart building network (e.g., as detected by facial expression analysis or audio analysis technologies), or any other information pertinent to change in state 216. The capability of second smart device 212 may further include sensing the contextual information.

Figure 4:
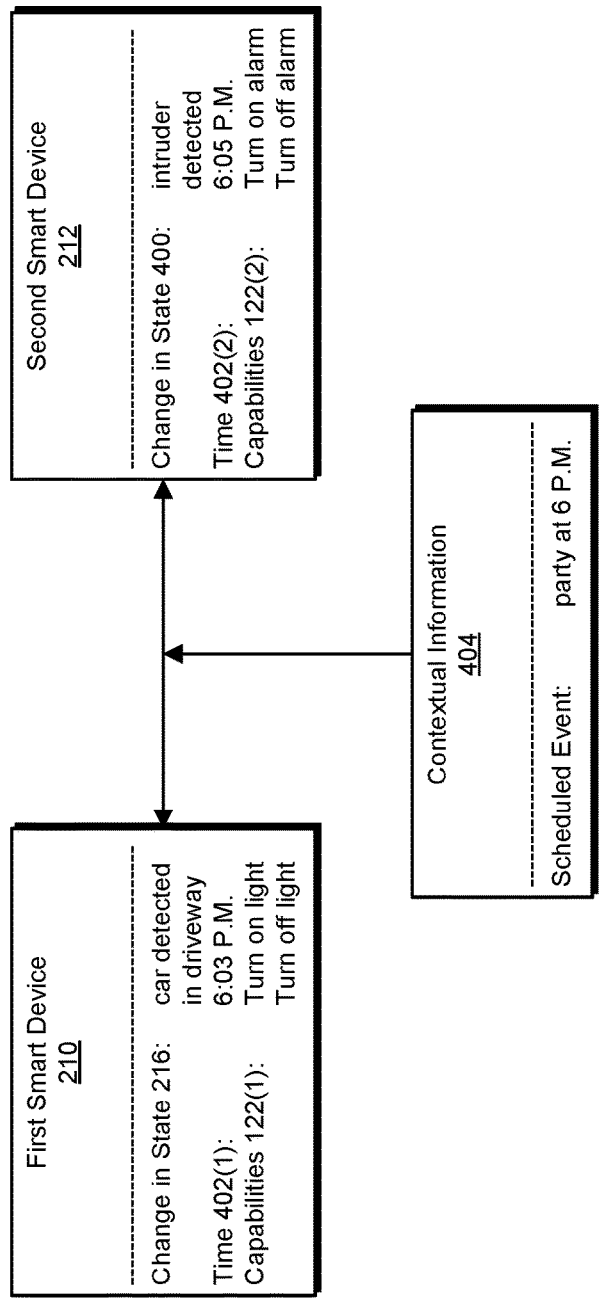
FIG. 4 is a block diagram of an exemplary correlation between two exemplary smart devices using exemplary contextual information.

For example, as shown in FIG. 4, first smart device 210 may have change in state 216 (e.g., "car detected in driveway") at a time 402(1) (e.g., "6:03 P.M."). First smart device 210 may further have capabilities 122(1) (e.g., "Turn on light" and "Turn off light"). Second smart device 212 may then have a change in state 400 (e.g., "intruder detected") at a time 402(2) (e.g., "6:05 P.M."). Second smart device 212 may further have capabilities 122(2) (e.g., "Turn on alarm" and "Turn off alarm"). Correlation module 110 may evaluate the proximity of first smart device 210 to second smart device 212 based on the proximity of time 402(1) to time 402(2) and group change in state 400 with change in state 216. Correlation module 110 may then correlate capabilities 122(2) of second smart device 212 to change in state 216 based on contextual information 404 about scheduled events in the smart building network (e.g., "party at 6 P.M."). By using contextual information 404, correlation module 110 may determine change in state 216 of first smart device 210 and change in state 400 of second smart device 212 are both related to the same scheduled event.

Returning to FIG. 3, at step 310, one or more of the systems described herein may trigger a management action in the smart building network based on both the proximity of the first smart device to the second smart device and the correlation between the first and second smart devices. For example, response module 112 may, as part of computing device 202 in FIG. 2, trigger management action 218 in the smart building network based on both the proximity of first smart device 210 to second smart device 212 and the correlation between first smart device 210 and second smart device 212.

Response module 112 may trigger management action 218 in a variety of ways. In one example, management action 218 may include retrieving one or more smart recipes, such as smart recipe 124 in FIG. 2, from a smart recipe database, modifying the smart recipe based on the correlation between first smart device 210 and second smart device 212, and presenting the modified smart recipe to a user of the smart building network. In this example, smart recipe 124 may be tailored to react to changes in first smart device 210 and/or second smart device 212, independently of other smart devices in the network that are not correlated. Smart recipe 124 may also affect multiple smart devices in close proximity. For example, smart recipe 124 may change the states of all smart devices within a room, and second smart device 212 may be triggered due to placement in the same room as first smart device 210.

Alternatively, in other examples, response module 112 may present smart recipe 124 to the user without modification, based on the correlation. Smart recipe 124 may include actions selected by other users of smart building networks to manage smart devices, a previous action selected by the user of the smart building network, a suggested action from a smart building service, or other commands that may modify a state of a smart device. In this example, the smart recipe database may include smart recipes from multiple users of similar smart building networks.

Figure 5:
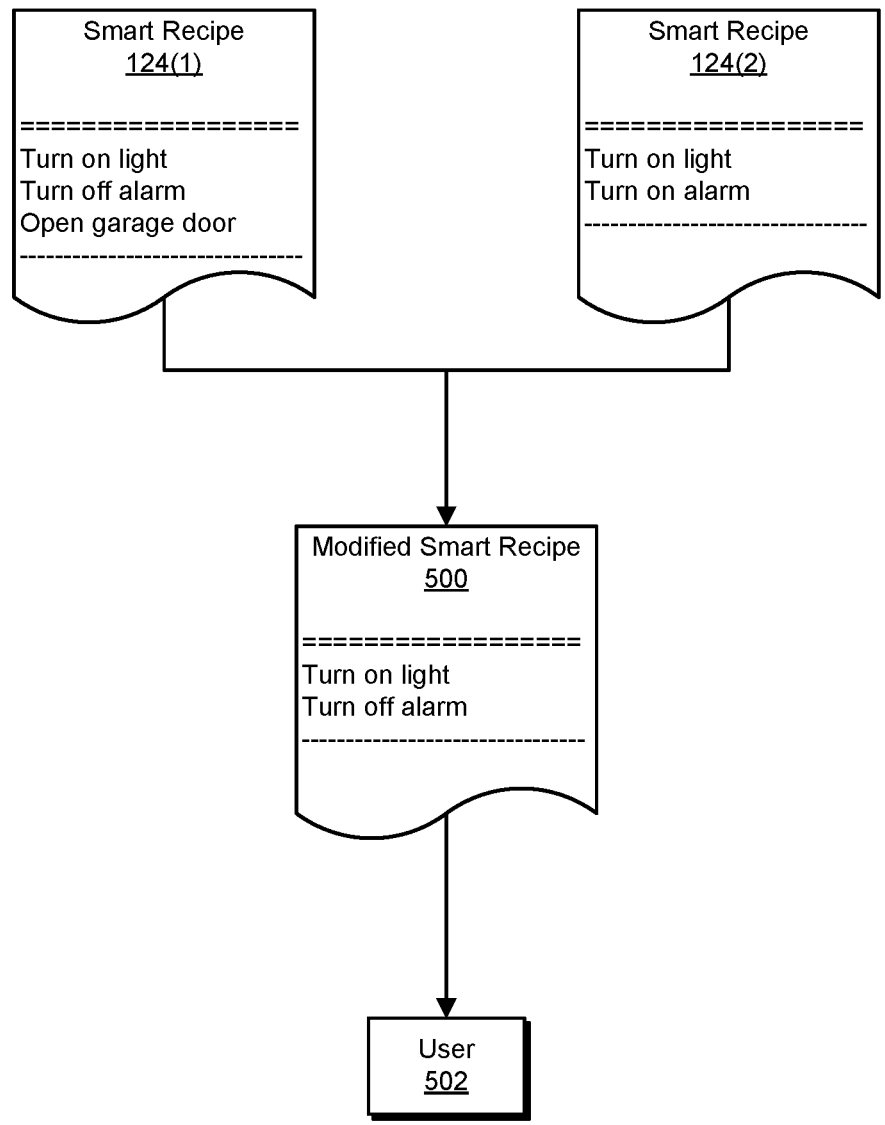
FIG. 5 is a block diagram of an exemplary modification of two exemplary smart recipes sent to a user.

For example, as shown in FIG. 5, response module 112 may retrieve a smart recipe 124(1) and a smart recipe 124(2) based on the correlation between first smart device 210 and second smart device 212 in FIG. 4. Smart recipe 124(1) and smart recipe 124(2) may include commands based on a correlation of capabilities 122(1) and 122(2) of the smart devices. Response module 112 may then create a modified smart recipe 500 from smart recipe 124(1) and smart recipe 124(2), based on the proximity of timing 402(1) and timing 402(2) in FIG. 4 suggesting a single event affecting first smart device 210 and second smart device 212, and present modified smart recipe 500 to a user 502 to react to the single event. Modified smart recipe 500 may additionally be added to the smart recipe database, with contextual information 404. By include contextual information 404, modified smart recipe 500 may be subsequently selected as a response for similar events.

In additional examples, response module 112 may further receive a smart recipe selection from the user and execute an action based on the smart recipe selection. For example, user 502 in FIG. 5 may select modified smart recipe 500, and response module 112 may send the commands (e.g., "Turn on light" and "Turn off alarm") to first smart device 210 and second smart device 212. Alternatively, the smart recipe selection may include a smart recipe modified by the user of the smart building network to respond to change in state 216 or a smart recipe created by the user to respond to change in state 216. The user-adapted or user-created smart recipe may then be added to the smart recipe database with contextual information 404. Response module 112 may also execute a pre-selected smart recipe based on change in state 216. In this example, change in state 216 may require immediate action, such as during a security breach, and user 502 may pre-select a smart recipe to react to detecting change in state 216 to avoid delay.

In other examples, management action 218 may include changing a state of second smart device 212. In the example of FIG. 2, management action 218 may change the state of second smart device 212 following a previously configured smart recipe, such as smart recipe 124. Alternatively, management action 218 may change the state of second smart device 212 separately from the commands of a smart recipe and/or independently of change in state 216. For example, user 502 may select modified smart recipe 500 in reaction to change in state 216. A subsequent similar change in state may automatically trigger commands from modified smart recipe 500 as part of management action 218. Furthermore, management action 218 may include changing a state of a different smart device correlated with or in proximity to first smart device 210.

As explained above in connection with method 300 in FIG. 3, the disclosed systems and methods may, by detecting individual smart devices in a smart building and the capabilities of those smart devices, provide tailored responses to changes in the smart building. Specifically, the disclosed systems and methods may first collect location and capability information about the smart devices to build a digital model of the smart building. For example, the systems and methods described herein may determine that a new smart TV is added to the living room of a house and is linked to sensors in the same room. The disclosed systems and methods may then detect a change in a smart device, such as a change in state caused by a user or a change in a sensor.

The disclosed systems and methods may further correlate smart devices based on the location of the devices, the timing of changes in the devices, and/or other contextual information about the smart building network. In the above example, the systems and methods described herein may detect the new smart TV turning off and correlate the change in state with sensors detecting a user leaving the living room. Based on correlation of changes in smart devices, the disclosed systems and methods may create custom smart recipes to react to the changes. For example, the disclosed systems and methods may determine that a smart recipe for the above example is to turn off the lights in the living room. Users may additionally create and modify smart recipes based on the relevance to the correlation of smart devices in the smart building network. Finally, the disclosed systems and methods may execute commands from a smart recipe selected by the user to manage the smart devices.

As detailed above, by correlating a change in state of a smart device with additional smart devices and other contextual information, the disclosed systems and methods may modify smart recipes to react to the specific circumstances of the change in state. In addition, by using location and proximity information, the disclosed systems and methods may better correlate smart devices that are related. Thus, the systems and methods described herein may provide the user with more nuanced smart recipes to manage the smart building network.

Figure 6:
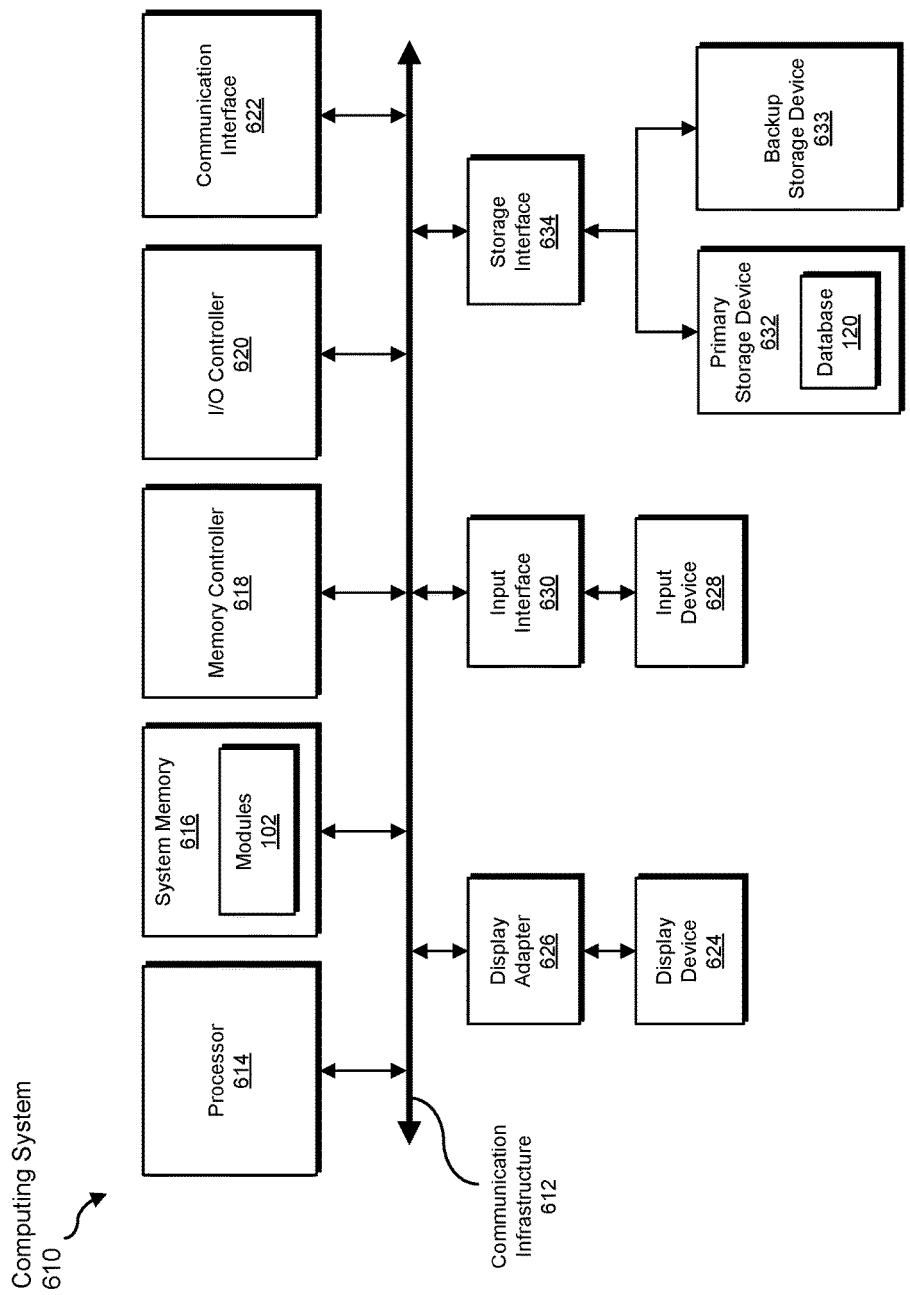
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for managing smart building systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a smart recipe to be transformed, transform the smart recipe, output a result of the transformation to a storage or output device, use the result of the transformation to manage a set of smart devices, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing smart building systems, at least a portion of the method being performed by a computing device comprising at least one processor, the method comprising:

detecting a set of smart devices in a smart building network, the set of smart devices comprising first and second smart devices;

maintaining a smart device management repository by, for each smart device in the set of smart devices:

maintaining information indicating one or more capabilities of the smart device and one or more smart recipes used to manage the smart device based on contextual information; and tracking a location of the smart device;

detecting a change in a state of the first smart device;

in response to detecting the change in state of the first smart device, using the smart device management repository to:

evaluate a proximity of the first smart device to the second smart device; and determine that a capability of the second smart device is correlated with the change in state of the first smart device after detecting additional contextual information about at least one scheduled event in the smart building network that affect states of the first smart device and/or the second smart device; and triggering a management action in the smart building network using the additional contextual information to modify at least one existing smart recipe that applies to the first smart device and/or the second smart device based on both the proximity of the first smart device to the second smart device and the correlation between the first and second smart devices, wherein the state of the second smart device is modified in response to the at least one scheduled event and the at least one modified smart recipe.

2. The method of claim 1, wherein maintaining the information indicating one or more capabilities of the smart device comprises at least one of:

detecting identifying information about the smart device;

adding the identifying information to the smart device management repository;

querying a database of smart device capabilities based on the identifying information; and detecting the capabilities of the smart device.

3. The method of claim 1, wherein the location of the smart device comprises at least one of:

a type of room in which the smart device is located; and
an orientation of the room within a smart building.

4. The method of claim 1, wherein the change in state of the first smart device comprises at least one of:
   a change in state of a sensor associated with the first smart device; and
   a change in state of a component of the first smart device.

5. The method of claim 1, wherein the proximity of the first smart device to the second smart device comprises at least one of:
   a physical proximity indicative of a difference in location between the first and second smart devices; and
   a temporal proximity indicative of a difference in timing of the change in state of the first smart device with a change in a state of the second smart device.

6. The method of claim 1, wherein determining that a capability of the second smart device is correlated with the change in state of the first smart device comprises correlating the second smart device with the first smart device based on the additional contextual information and the proximity of the first smart device to the second smart device.

7. The method of claim 1, wherein the management action in the smart building network comprises:
   retrieving the at least one existing smart recipe from a smart recipe database;
   presenting the at least one modified smart recipe to a user of the smart building network.

8. The method of claim 7, further comprising:
   receiving a smart recipe selection from the user of the smart building network; and
   executing at least one action in the smart building network based on the smart recipe selection.

9. A system for managing smart building systems, the system comprising:
   a device module, stored in memory, that detects a set of smart devices in a smart building network, the set of smart devices comprising first and second smart devices;
   a maintenance module, stored in memory, that maintains a smart device management repository by, for each smart device in the set of smart devices:
      maintaining information indicating one or more capabilities of the smart device and one or more smart recipes used to manage the smart device based on contextual information; and
      tracking a location of the smart device;
   a detection module, stored in memory, that detects a change in a state of the first smart device;
   a correlation module, stored in memory, that, in response to detecting the change in state of the first smart device, uses the smart device management repository to:
      evaluate a proximity of the first smart device to the second smart device; and
      determine that a capability of the second smart device is correlated with the change in state of the first smart device after detecting additional contextual information about at least one scheduled event in the smart building network that affect states of the first smart device and/or the second smart device;
   a response module, stored in memory, that triggers a management action in the smart building network using the additional contextual information to modify at least one existing smart recipe that applied to the first smart device and/or the second smart device based on both the proximity of the first smart device to the second smart device and the correlation between the first and second smart devices, wherein the state of the second smart device is modified in response to the at least one scheduled event and the at least one modified smart recipe; and
   at least one processor that executes the device module, the maintenance module, the detection module, the correlation module, and the response module.

10. The system of claim 9, wherein the maintenance module maintains the information indicating one or more capabilities of the smart device by at least one of:
    detecting identifying information about the smart device;
    adding the identifying information to the smart device management repository;
    querying a database of smart device capabilities based on the identifying information; and
    detecting the capabilities of the smart device.

11. The system of claim 9, wherein the location of the smart device comprises at least one of:
    a type of room in which the smart device is located; and
    an orientation of the room within a smart building.

12. The system of claim 9, wherein the change in state of the first smart device comprises at least one of:
    a change in state of a sensor associated with the first smart device; and
    a change in state of a component of the first smart device.

13. The system of claim 9, wherein the proximity of the first smart device to the second smart device comprises at least one of:
    a physical proximity indicative of a difference in location between the first and second smart devices; and
    a temporal proximity indicative of a difference in timing of the change in state of the first smart device with a change in a state of the second smart device.

14. The system of claim 9, wherein the correlation module determines that a capability of the second smart device is correlated with the change in state of the first smart device by correlating the second smart device with the first smart device based on the additional contextual information and the proximity of the first smart device to the second smart device.

15. The system of claim 9, wherein the management action in the smart building network comprises:
    retrieving the at least one existing smart recipe from a smart recipe database;
    presenting the at least one modified smart recipe to a user of the smart building network.

16. The system of claim 15, further comprising:
    receiving a smart recipe selection from the user of the smart building network; and
    executing at least one action in the smart building network based on the smart recipe selection.

17. A non-transitory computer-readable medium comprising one or more computer-executable instructions that, when executed by at least one processor of a computing device, cause the computing device to:
    detect a set of smart devices in a smart building network, the set of smart devices comprising first and second smart devices;
    maintain a smart device management repository by, for each smart device in the set of smart devices:
       maintaining information indicating one or more capabilities of the smart device and one or more smart recipes used to manage the smart device based on contextual information; and
       tracking a location of the smart device;
    detect a change in a state of the first smart device;

in response to detecting the change in state of the first smart device, use the smart device management repository to:
- evaluate a proximity of the first smart device to the second smart device; and
- determine that a capability of the second smart device is correlated with the change in state of the first smart device after detecting additional contextual information about at least one scheduled event in the smart building network that affect states of the first smart device and/or the second smart device; and trigger a management action in the smart building network using the additional contextual information to modify at least one existing smart recipe that applied to the first smart device and/or the second smart device based on both the proximity of the first smart device to the second smart device and the correlation between the first and second smart devices, wherein the state of the second smart device is modified in response to the at least one scheduled event and the at least one modified smart recipe.

18. The non-transitory computer-readable medium of claim 17, wherein the computer-executable instructions cause the computing device to maintain the information indicating one or more capabilities of the smart device by at least one of:
- detecting identifying information about the smart device;
- adding the identifying information to the smart device management repository;
- querying a database of smart device capabilities based on the identifying information; and
- detecting the capabilities of the smart device.

* * * * *